G. H. SARGENT.
WATER GAGE.
APPLICATION FILED APR. 22, 1918.
1,380,079.
Patented May 31, 1921.
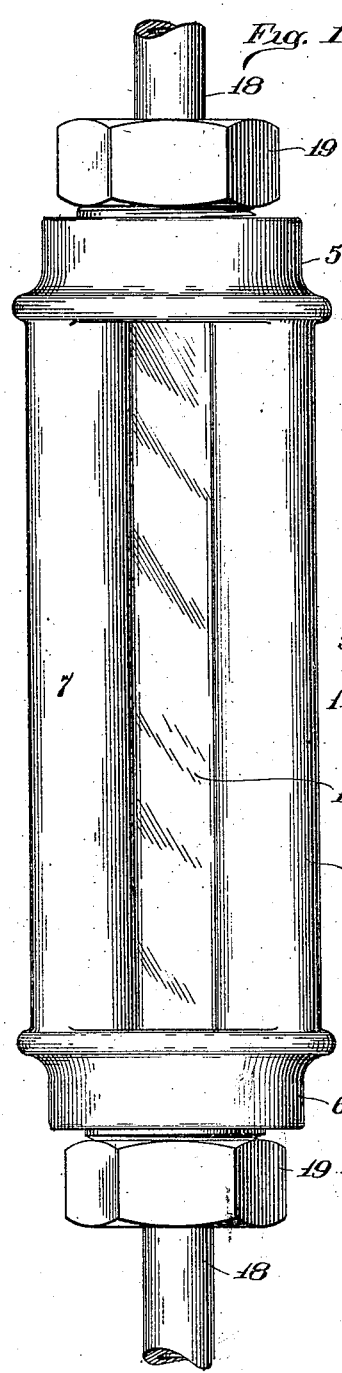
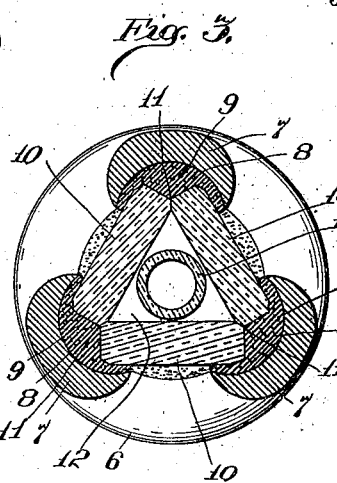
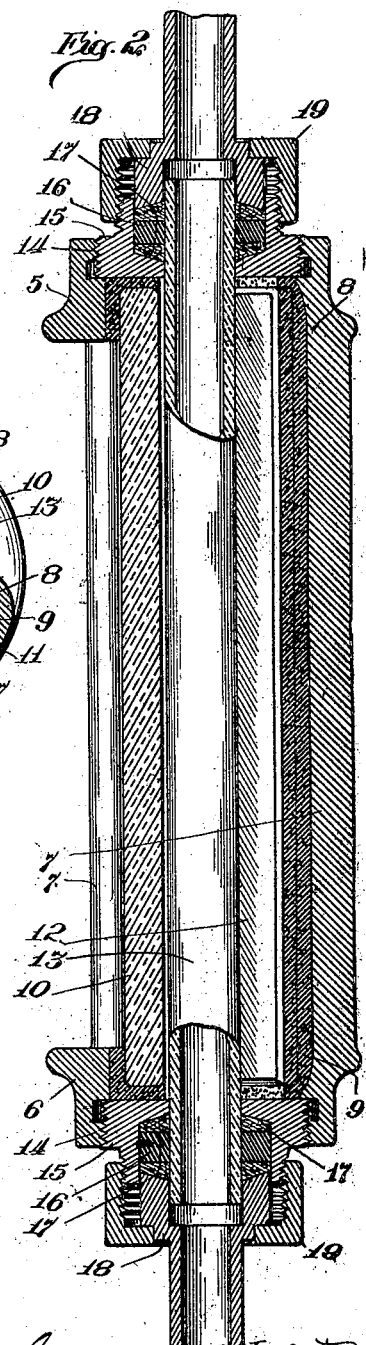

UNITED STATES PATENT OFFICE.

GEORGE H. SARGENT, OF CHICAGO, ILLINOIS, ASSIGNOR TO SARGENT COMPANY, OF CHICAGO, ILLINOIS, A CORPORATION OF ILLINOIS.

WATER-GAGE.

1,380,079.    Specification of Letters Patent.    Patented May 31, 1921.

Application filed April 22, 1918. Serial No. 229,926.

*To all whom it may concern:*

Be it known that I, GEORGE H. SARGENT, a citizen of the United States, and a resident of Chicago, in the county of Cook and State of Illinois, have invented certain new and useful Improvements in Water-Gages, of which the following is a description, reference being had to the accompanying drawing, which forms a part of my specification.

My invention relates to water gages, employed on steam boilers and similar devices, for the purpose of indicating the fluid level, under pressure in the container or boiler.

The device, in a general way, comprises the usual transparent tube or water-glass mounted perpendicular to the horizontal plane of the normal water level in the boiler; the water-glass or tube being suitably connected at both ends thereof with the fluid container or boiler so that the level of the water may be indicated in the tube.

In view of the deteriorating effects of the steam and heated water on the water-glass or tube, whereby the latter is eventually weakened, the glass or tube is apt to yield to internal pressure, thus making it essential to employ means for properly inclosing the water-glass or tube, both for the purpose of preventing injury to the attendant and for protecting the water-glass or tube from external damage. It is essential, however, in providing inclosing means of suitable strength and rigidity, that the inclosing means be so formed as to permit proper observation, from the usual positions of the enginemen or attendants, of the water level in the water-glass or tube, and at the same time to admit sufficient light into the casing or inclosing means in order that the water level in the water-glass or tube may be quickly discerned.

I have ascertained, from practical experience, that in order to minimize the effect of any explosions, due to the fracture of the water-glass or tube, it is essential to construct a water gage wherein the inner wall of the inclosing means or casing, and especially of the transparent walls or panels thereof, will be in close proximity to the water-tube or glass without having actual physical contact therewith. It is also essential in a device of this character, that the casing possess sufficient rigidity in order to maintain the proper connections of the water-glass or inner tube with the boilers; and at the same time provide a device which will give proper support for the transparent or glass panels so as to avoid improper or torsional strains on the glass. At the same time my invention contemplates a casing and connecting elements or couplings so formed that the packing, for providing steam and water-tight connections between the water-glass or tube and the coupling elements of the gage, will be properly maintained and forced into suitable contact with the water-glass or tube; the coupling elements and glands being so constructed that the packing will not be in contact with any of the threaded surfaces of the coupling elements where it would interfere with proper tight connections being effected from time to time.

The foregoing enumerated advantages and objects of my invention will be readily comprehended from the following detailed description of the accompanying drawing, wherein:—

Figure 1 is a side elevation of my improved water gage.

Fig. 2 is a vertical longitudinal sectional view, with a portion of the water-glass or tube also shown in vertical section.

Fig. 3 is a transverse sectional view taken at a point intermediate of the ends of the gage.

In the particular exemplification of the invention, it comprises an outer metallic shell or casing comprising the enlarged ends or head portions 5 and 6 preferably integrally connected together by means of the side members or ribs 7 of suitable thickness. The ribs 7, which constitute the metallic sides of the casing, are disposed about the sides of the casing in a triangular manner relative to one another, as clearly shown in Fig. 3, so that the main or body portion thereof, intermediate of the end portions, is triangular in cross section, and the casing therefore provided with three elongated sight openings, disposed in different directions, intermediate of the end portions 5 and 6. The rib members 7, especially along their longitudinal edges adjacent the sight openings, are preferably formed with a curvature in order that the sight openings may be made outwardly flaring, as shown in Fig. 3, thus admitting sufficient light and enabling the water-tube to be visible from various points. The inner sides of the side members or ribs 7 are preferably dished or recessed, as indicated at 8, (Fig. 3), in order to receive suitable hydraulically setting material indicated at 9, which is molded in the casing and extends full length of the rib members 7 and into the end portions 5 and 6 for a predetermined distance; any suitable means being employed to properly mold the material 9. The three sides of the casing, intermediate of the side members or ribs 7, namely the sight openings previously described, are provided with glass panels 10, of suitable thickness, preferably flat, and rectangular in cross-section; the panels 10 being of somewhat greater length and width than the sight openings in the sides of the casing, in order that the marginal edges of the glass panels, at both sides and both ends thereof, may be properly embedded in the hydraulically setting material 9. The dishing or recessing of the inner sides of the side members or ribs 7, and the width of the glass panels 10 are so correlated, that the marginal edges of the glass panels will be embedded in the hydraulically setting material 9 without having the glass panels contacting with the metallic walls of the casing. The glass panels 10 are, of course, embedded in the material 9 before the latter becomes thoroughly "set" or hardened; the longitudinal edges of the glass panels 10 being preferably slightly beveled, as shown at 11 in Fig. 3, thus forming a close fitting relation between the glass panels. The panels 10 when in place will provide the triangular chamber 12 for the reception of the usual water-tube or glass 13. The material 9 is preferably treated with a suitable hardening solution in order that an unyielding solid and rigid mass may be provided to enable the glass panels 10 to resist pressure; the rigid unyielding nature of the filler, as well as of the outer shell or casing, at the same time preventing any torsional or unequal strains being set up in the glass, which, as experience has shown, where glass panels were mounted in a material or casing which was in the slightest degree ductile or elastic, caused the glass panels to become fractured and hence destroyed the utility of the gage.

The transverse dimensions of the triangular chamber 12 are such, relative to the diameter of the water-tube or glass 13, as to permit slight variations in the diameter of the water-glass or tube 13 and yet provide an intimate relation between the tube 13 and the glass panels 10 without actual physical contact therebetween.

The portions of the ends or heads 5 and 6, disposed away from the panels 10, are counterbored, as shown in Fig. 2, and the counterbored portions threaded as shown at 14, to receive the coupling members 15 which are externally threaded and adapted to come into contact with the hydraulically setting material 9 at the ends of the glass panels 10, (Fig. 2). The coupling members 15 are socketed or counterbored to receive an elastic packing element 16 which is formed to fit snugly about the glass tube or water-glass 13 at both ends thereof, as shown in Fig. 2; the socketed or counterbored portions of the members 15 are preferably dished toward the water-glass receiving opening thereof, as shown at 17. The coupling members 15 are also adapted to receive the gland members 18, whose inner surfaces are also dished toward the central opening extending therethrough. The gland members 18, adapted to fit into the smooth socket or counterbore of the coupling members 15, are maintained in place and forced downward onto the packing 16 by means of a suitable union nut 19 which screws onto the reduced and externally threaded portion of the coupling members 15. The packing element 16 is shown composed of rubber and asbestos, that is the opposite sides of the packing consists of asbestos which will prevent the heated rubber from running along the water-glass 13; it being understood, however, that any suitable packing may be employed.

The gland members 18 are shown in the nature of nipples, (Fig. 2); the tubular extensions or nipples providing means wherewith to form suitable fluid connections with the boiler.

It is evident from the construction shown and described, that the packing elements 16, at both ends of the gage, will be forced toward the water-tube or glass 13 by the coacting dished surfaces of the coupling members 15 and the nippled gland members 18, thus insuring a constant close relation between the packing and the water-tube or glass, whereby the water-glass 13 will be maintained in proper position and a fluid-tight relation effected. With my improved gage, wherein the shield glasses or glass panels 10 are arranged in the triangular relation shown in Fig. 3, observation of the water level in the water-tube 13 is permitted from various points on opposite sides of the gage, while at the same time light is admitted from all sides of the gage toward the water-tube. In the event of a fracture occurring in the water-glass 13, the same may be readily removed and replaced, by simply unscrewing the nut 19, which releases the nippled gland member 18, enabling the packing element 16 and the glass-tube to be removed.

The metal casing with the hydraulically setting material and heavy glass panels, as hereinbefore described, form a very rigid unit adapted to withstand the unequal and varying temperatures to which it is subjected, and at the same time adequately protecting the water-tube.

The construction shown and described, I believe, to be the best embodiment of my invention; certain alterations in minor respects may be made without, however, departing from the spirit of my invention as set forth in the appended claims.

What I claim is:—

1. A water gage, comprising a rigid metallic casing consisting of end portions connected by elongated rib portions disposed in a triangulated manner so as to provide three elongated sight openings disposed in different directions, the inner surfaces of the rib-portions being formed to receive hydraulically setting material, glass panels mounted in said casing transversely of said openings, with their edges arranged rearward of the respective rib portions and held in place by the hydraulically setting material without physical contact with the metallic casing, a cylindrical water-glass disposed longitudinally of the casing, and means whereby said water-glass is removably maintained in place.

2. A water gage, comprising a metallic casing consisting of end portions connected by elongated rib portions formed integral with the end portions and disposed in a triangulated manner at equi-distances apart so as to provide three elongated sight openings disposed in different directions, the inner surfaces of the rib portions being recessed to receive hydraulically setting material, glass panels mounted in the casing transversely of said openings, the longitudinal edges of the glass panels being in abutting relation with one another at points coincident with said rib portions, with the marginal edges of said glass panels embedded in the hydraulically setting material, a cylindrical water-glass disposed longitudinally within the casing, and means whereby said water-glass is removably held in place.

3. A water gage, comprising a rigid metallic casing consisting of end portions connected by elongated rib portions disposed in a triangulated manner at equi-distances apart so as to provide three elongated sight-openings disposed in different directions, hydraulically setting material disposed along the inner sides of the metallic casing, glass panels mounted in said casing transversely of said openings with the marginal edges of said panels embedded in said hydraulically setting material, the end portions of the casing having internally threaded sockets, coupling members threaded into the sockets of said end portions and provided with smooth surfaced packing receiving sockets, nippled gland members adapted to extend into said coupling members, a cylindrical water-glass disposed longitudinally in the casing with the ends thereof extending into said coupling members and adapted to be maintained in place by the packing in said coupling members, and means secured to the coupling members and adapted to force said nippled gland members into pressing relation with the packing.

4. A water gage, comprising a metallic casing consisting of end portions connected by elongated rib portions formed integral therewith and disposed in a triangulated manner at equi-distances apart so as to provide three elongated openings disposed in different directions, hydraulically setting material disposed along the inner walls of the casing, glass panels arranged in said casing transversely of said openings with the marginal edges of said panels embedded in the hydraulically setting material, the end portions of the casing being provided with internally threaded sockets, coupling members threaded into said sockets and provided with dished packing-receiving sockets, a cylindrical water glass disposed lengthwise within the casing with the ends thereof extending into said coupling members, a packing element disposed in the sockets of each coupling member and encircling the ends of the water-glass so as to maintain the latter in place, a nippled gland member adapted to extend into each coupling member and into pressing relation with the packing element, and means adapted to screw onto said coupling members and force said nippled gland members into pressing relation with the packing elements.

5. A water gage, comprising a metallic casing consisting of internally threaded end portions connected by elongated rib portions formed integral therewith and disposed in a triangulated manner at equi-distances apart so as to provide a three sided casing, at points intermediate of the ends of the casing thus providing three sight openings disposed in different directions, glass panels mounted in said casing transversely of the sight openings, with the marginal edges of the panels embedded in hydraulically setting material, a cylindrical water glass disposed longitudinally within the casing, and coupling means arranged to screw into the internally threaded portions of the end members.

6. A water gage, comprising a metallic casing consisting of end portions formed integral with three elongated rib portions which are disposed in a triangulated manner at equi-distances apart so as to provide elongated sight openings disposed in different directions, the longitudinal sides of the rib portions being formed with a curvature so as to provide outwardly flaring openings intermediate of the rib portions, flat glass panels, substantially rectangular in cross-section, arranged in said casing transversely of the sight openings, with the marginal edges of the glass panels embedded in hydraulically setting material, a cylindrical water-glass disposed longitudinally in the casing, and means adapted to screw into the end portions of the casing and to receive the ends of the water-glass.

7. A water gage, comprising an integral casing consisting of two end portions connected together by elongated rib portions disposed in a triangulated manner at equi-distances apart so as to provide elongated sight openings disposed in different directions, the longitudinal sides of the rib portions being curved outwardly so as to provide outwardly flared sight openings, while the inner surfaces of the rib portions are recessed, hydraulically setting material disposed in the recesses of said rib portions and the end portions, the end portions being provided with internally threaded orifices, flat glass panels, substantially rectangular in cross section, arranged in said casing transversely of said sight openings with the marginal edges thereof embedded in said hydraulically setting material, a water-glass disposed longitudinally in said casing intermediate of the glass panels, with the ends thereof extending into the end portions of the casing, coupling members arranged to screw into the threaded orifices of the end portions and adapted to receive the ends of the water-glass, said coupling members having dished sockets, packing elements arranged in the sockets of both coupling members and about the ends of the water-glass, and means slidable in the sockets of said connecting members and having dished surfaces to contact with the packing elements whereby the latter are forced toward the water-glass.

8. A water gage, comprising a metallic casing having end portions connected together by elongated rib portions disposed in a triangular manner in separated relation so as to provide three elongated openings, glass panels mounted in the casing transversely of said openings and held in place by hydraulically setting material, a water-glass disposed longitudinally in the casing, coupling members removably secured in the end portions and provided with packing-receiving sockets disposed about the ends of the water-glass, packing glands slidably mounted in said coupling members, and means whereby the packing glands are controlled and maintained in place.

GEORGE H. SARGENT.

Witnesses:
GEORGE HEIDMAN,
F. A. FLORELL.